(12) United States Patent
Kim et al.

(10) Patent No.: US 10,906,514 B1
(45) Date of Patent: Feb. 2, 2021

(54) FOLDABLE BRAKE PEDAL APPARATUS FOR AUTONOMOUS VEHICLE

(71) Applicants: Hyundai Motor Company, Seoul (KR); Kia Motors Corporation, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Sung Il Byun, Daegu (KR)

(73) Assignees: Hyundai Motor Company, Seoul (KR); Kia Motors Corporation, Seoul (KR); Kyung Chang Industrial Co., Ltd., Daegu (KR)

(*) Notice: Subject to any disclaimer, the term of this patent is extended or adjusted under 35 U.S.C. 154(b) by 0 days.

(21) Appl. No.: 17/012,959

(22) Filed: Sep. 4, 2020

(30) Foreign Application Priority Data

Apr. 21, 2020 (KR) .......................... 10-2020-0047970

(51) Int. Cl.
*B60R 21/09* (2006.01)
*B60T 7/04* (2006.01)
(Continued)

(52) U.S. Cl.
CPC .............. *B60T 7/042* (2013.01); *B60R 21/09* (2013.01); *B60T 7/06* (2013.01); *G05G 1/38* (2013.01);
(Continued)

(58) Field of Classification Search
CPC . B60R 21/09; G05G 1/30; G05G 1/32; G05G 1/38; G05G 1/40; G05G 1/405;
(Continued)

(56) References Cited

U.S. PATENT DOCUMENTS 6,182,525 B1 * 2/2001 Bowers .................. B60K 20/02
180/274
6,364,047 B1 4/2002 Bortolon
(Continued)

FOREIGN PATENT DOCUMENTS

FR 2981889 A1 * 5/2013 .............. G05G 5/05
KR 10-2017-0137427 A 12/2017

OTHER PUBLICATIONS

Machine Translation of FR 2981889, obtained Nov. 4, 2020.*

*Primary Examiner* — Richard W Ridley
*Assistant Examiner* — Brian J McGovern
(74) *Attorney, Agent, or Firm* — Morgan, Lewis & Bockius LLP (57) ABSTRACT

A foldable brake pedal apparatus of an autonomous vehicle, may include a pedal housing to be mounted in a space below a driver's seat; a pedal pad pivotably coupled to the pedal housing via a hinge pin, in a response to movement of s driver's foot, and configured to be selectively switchable to a hidden state in which the pedal pad is inserted into the pedal housing or a popped-up state in which the pedal pad protrudes from the pedal housing; an actuator fixed in the pedal housing, coupled to the pedal pad and configured to generate power to pivot the pedal pad to allow the pedal pad to be in the hidden state or in the popped-up state; and a high load spring module pivotably coupled to the pedal housing, having one end portion thereof and the other end portion connected to the pedal pad and the actuator, and configured to transmit the power of the actuator to the pedal pad.

18 Claims, 10 Drawing Sheets (51) Int. Cl.
*B60T 7/06* (2006.01)
*G05G 1/40* (2008.04)
*G05G 5/00* (2006.01)
*G05G 5/05* (2006.01)
*G05G 1/38* (2008.04)
*G05G 5/03* (2008.04)
*G05G 1/30* (2008.04)
*G05G 1/44* (2008.04)
*G05G 5/28* (2006.01)

(52) U.S. Cl.
CPC ............. *G05G 1/40* (2013.01); *G05G 5/005* (2013.01); *G05G 5/03* (2013.01); *G05G 5/05* (2013.01); *B60T 7/065* (2013.01); *G05G 1/30* (2013.01); *G05G 1/44* (2013.01); *G05G 5/28* (2013.01)

(58) Field of Classification Search
CPC .......... G05G 1/44; G05G 1/445; G05G 5/005; G05G 5/28; G05G 5/03; G05G 5/05; B60K 2026/026; B60K 26/021; B60K 26/02; B60T 7/065; B60T 7/06; B60T 7/04
See application file for complete search history.

(56) References Cited

U.S. PATENT DOCUMENTS

| | | | |
|---|---|---|---|
| 9,283,934 B2* | 3/2016 | Shand | G05G 5/03 |
| 10,739,011 B2* | 8/2020 | Cowan | F24C 3/126 |
| 2004/0259687 A1* | 12/2004 | Ritter | B60T 7/042 |
| | | | 477/187 |
| 2008/0147287 A1 | 6/2008 | Park | |
| 2009/0223319 A1* | 9/2009 | Choi | G05G 1/36 |
| | | | 74/512 |
| 2010/0139445 A1 | 6/2010 | Kim | |
| 2011/0132134 A1* | 6/2011 | Kim | G05G 1/30 |
| | | | 74/514 |
| 2013/0125682 A1 | 5/2013 | Kim | |
| 2014/0311278 A1 | 10/2014 | Min | |
| 2014/0316648 A1* | 10/2014 | Min | B60W 50/08 |
| | | | 701/36 |
| 2014/0373667 A1* | 12/2014 | Kim | G05G 1/40 |
| | | | 74/513 |
| 2015/0107402 A1* | 4/2015 | Leem | G05G 1/40 |
| | | | 74/512 |

* cited by examiner

FOLDABLE BRAKE PEDAL APPARATUS FOR AUTONOMOUS VEHICLE

CROSS REFERENCE TO RELATED APPLICATION

The present application claims priority to Korean Patent Application No. 10-2020-0047970 filed on Apr. 21, 2020, the entire contents of which is incorporated herein for all purposes by this reference.

BACKGROUND OF THE INVENTION

Field of the Invention

The present invention relates to a foldable brake pedal apparatus of an autonomous vehicle, and more particularly, to a technology for a foldable brake pedal apparatus of an autonomous vehicle, in which, in a manual driving mode in which a driver directly drives an autonomous vehicle, a pedal pad protrudes from a pedal housing to be exposed to the driver to allow the driver to operate an autonomous vehicle, and in an autonomous driving mode, the pedal pad is inserted into the pedal housing to be blocked from being exposed to the driver to prevent an operation of the autonomous vehicle from being performed by the driver.

Description of Related Art

Autonomous vehicles are smart vehicles with autonomous driving technologies for which the smart vehicles reach destinations by themselves even when drivers do not directly operate steering wheels, accelerator pedals, brakes, and the like. Recently, development of the autonomous vehicles is progressing rapidly.

When an autonomous driving mode is realized, it is possible to select a manual driving mode in which a driver directly drives an autonomous vehicle, and an autonomous driving mode in which the autonomous vehicle travels by itself to a destination even when the driver does not directly drives the autonomous vehicle.

In the autonomous driving mode, since the driver may need to comfortably rest by extending his or her feet, when pedals (an acceleration pedal and a brake pedal) located in a space below a driver's seat are present as being directly exposed to an interior of the autonomous vehicle, there is a disadvantage of hindering the driver's rest.

Furthermore, the autonomous driving mode is a mode in which the driver does not operate the pedals (the acceleration pedal and the brake pedal) of the autonomous vehicle. When the driver operates the pedals during the autonomous driving mode, a vehicle controller is configured to determine that the driver terminates the autonomous driving mode and wants to directly drive the autonomous vehicle, terminating control for the autonomous driving.

However, since the pedals of the autonomous vehicle are configured to be exposed to the space below the driver's seat, there is a concern in that the driver may unconsciously operate the pedals in the autonomous driving situation (a situation in which the pedals are incorrectly operated). In the instant case, there is a concern in that an accident may occur according to a road condition and a vehicle-to-vehicle distance.

Therefore, it is necessary for technological development in a new pedal device in which the pedal pads are exposed to the interior of the autonomous vehicle to allow the driver to operate the autonomous vehicle in the manual driving mode in which the driver directly drives the autonomous vehicle, and the pedal pads are blocked to be exposed to the interior of the autonomous vehicle to prevent the driver from operating the autonomous vehicle for safety such as comfortable rest and prevention of an incorrect operation of the driver in the autonomous driving mode.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a foldable brake pedal apparatus of an autonomous vehicle, in which, in a manual driving mode in which a driver directly drives an autonomous vehicle, a pedal pad protrudes from a pedal housing to be exposed to the driver to allow the driver to operate an autonomous vehicle, and in an autonomous driving mode, the pedal pad is inserted into the pedal housing to be blocked from being exposed to the driver to prevent an operation of the autonomous vehicle from being performed by the driver, and to allow the driver to rest comfortably in the autonomous driving mode and further achieve improvement in stability by blocking an incorrect operation of the pedal pad in the autonomous driving mode.

Furthermore, the present invention is directed to propose a foldable brake pedal apparatus of an autonomous vehicle, which has a configuration in which a pedal effort is implemented using a high load spring module. Consequently, it is possible to use a low capacity motor employed in a general foldable accelerator pedal device so that costs may be reduced.

According to one aspect, there is provided a foldable brake pedal apparatus of an autonomous vehicle, which includes a pedal housing to be mounted in a space below a driver's seat; a pedal pad pivotably coupled to the pedal housing via a hinge pin, in a response to movement of s driver's foot, and configured to be selectively switchable to a hidden state in which the pedal pad is inserted into the pedal housing or a popped-up state in which the pedal pad protrudes from the pedal housing; an actuator fixed in the pedal housing, coupled to the pedal pad and configured to generate power to pivot the pedal pad to allow the pedal pad to be in the hidden state or in the popped-up state; and a high load spring module pivotably coupled to the pedal housing, having one end portion thereof and the other end portion connected to the pedal pad and the actuator, and configured to transmit the power of the actuator to the pedal pad.

The foldable brake pedal apparatus may further include an actuator control printed circuit board (PCB) fixed in the pedal housing and electrically connected to the actuator to control an operation of the actuator.

The foldable brake pedal apparatus may further include a pedal sensor fixed in the pedal housing, mechanically connected to the pedal pad through a pivoting lever, and configured to detect a pivoting angle of the pedal pad when the pedal pad is pivoted about the pivot pin to generate a signal related to braking of the vehicle.

The pedal pad may be an organ-type pad of which a lower end portion is coupled to the pedal housing via the hinge pin, and of which an upper end portion is pivoted back and forth about the hinge pin.

The pedal pad may include an operating surface to be operated according to movement of the driver's foot and a body formed to protrude forward from the operating surface and having a lower end portion to which the hinge pin is pivotally coupled; and the pedal pad may become the hidden state when the body is inserted into the pedal housing according to an operation of the actuator and becomes to be in the popped-up state when the body protrudes from the pedal housing.

The pedal pad may include an operating surface to be operated according to movement of the driver's foot and a body formed to protrude forward from the operating surface and having a lower end portion to which the hinge pin is pivotally coupled; a housing hole through which the body passes may be formed in the pedal housing; and an external size of the operating surface of the pedal pad may be formed to be greater than an external size of the housing hole so that, when the pedal pad is pivoted, the housing hole may be sealed by the operating surface.

The actuator may include a linear-type motor fixed in the pedal housing, and a plunger coupled to the linear-type motor and configured to vertically move back and forth during an operation of the linear-type motor and pivotably coupled to a front end portion of the high load spring module, wherein, wherein, when the plunger moves back and forth, the high load spring module may be pivoted with respect to the pedal housing, and due to the pivoting of the high load spring module, the pedal pad may be switched to the hidden state or the popped-up state.

An operating surface to be operated according to movement of the driver's foot and a guide slot extending in an inclined direction of the operating surface may be provided in the pedal pad; a rear end portion of the high load spring module may be inserted into the guide slot to be connected to the pedal pad; and according to the back and forth movement of the plunger, the high load spring module may be pivoted with respect to the pedal housing, and according to a movement of the rear end portion of the high load spring module along the guide slot, the pedal pad may be switched to the hidden state or the popped-up state.

When a supply of power to the linear-type motor is cut off, the plunger may perform a rearward movement in which the plunger is inserted into the linear-type motor, the high load spring module may be pivoted with respect to the pedal housing to direct the front end portion, which is connected to the plunger, to be located further upward than the rear end portion connected to the guide slot, and when the high load spring module is pivoted, the rear end portion of the high load spring module may be moved along the guide slot to be located at a lowermost end portion of the guide slot so that the pedal pad may become the hidden state of being inserted into the pedal housing.

When power is supplied to the linear-type motor, the plunger may perform a forward movement in which the plunger may protrude outwardly from the linear-type motor, the high load spring module may be pivoted with respect to the pedal housing to direct the front end portion, which is connected to the plunger, to be located further downward than the rear end portion connected to the guide slot, and when the high load spring module is pivoted, the rear end portion of the high load spring module may be moved along the guide slot to be located at an uppermost end portion of the guide slots so that the pedal pad may become the popped-up state of protruding from the pedal housing.

Based on the popped-up state in which the pedal pad protrudes from the pedal housing, an angle θ between a first line straightly connecting a center portion in a longitudinal direction of the high load spring module and a second line straightly connecting a center portion in a longitudinal direction of the guide slot may be formed to satisfy a condition of 60°≤θ≤90°.

When the high load spring module is pivoted with respect to the pedal housing according to the back and forth movement of the plunger, and a pivoting lever connected to the pedal pad may be pivoted while the pedal pad is pivoted with respect to the pedal housing due to the pivoting of the high load spring module, a pedal sensor may not generate a signal related to braking to prevent an incorrect operation.

In a situation in which the pedal pad is in the popped-up state and the plunger does not perform the back and forth movement, only when the pedal pad is pivoted with respect to the pedal housing due to an operation of the driver and a pivoting lever connected to the pedal pad is pivoted, a pedal sensor may generate a signal related to braking of the vehicle.

The high load spring module may include an external cylinder pivotably coupled to the plunger via a connection pin and formed such that a pivoting shaft pivotably coupled to the pedal housing protrudes outward; an internal cylinder having one end portion inserted into the external cylinder and movably coupled to the external cylinder in a longitudinal direction thereof; a spring seat inserted into the internal cylinder and configured to be movable in a longitudinal direction of the internal cylinder; a connection rod having one end portion connected to the spring seat and the other end portion connected to a guide pin inserted into the guide slot formed in the pedal pad; a first spring located in the external cylinder and having both end portions configured to be supported on the external cylinder and the internal cylinder; a second spring located in the internal cylinder and having both end portions configured to be supported on the internal cylinder and the spring seat; a first damper fixed in the external cylinder at a position spaced from the internal cylinder; and a second damper fixed in the internal cylinder at a position spaced from the spring seat.

A spring force of the second spring may be set to be greater than a spring force of the first spring.

The spring seat and the connection rod may be integrally formed.

The spring seat and the connection rod may be individually formed and may be pivotably coupled via a rod pin.

When the pedal pad is pivoted forward about the hinge pin as the driver operates the pedal pad in a popped-up state in which the pedal pad protrudes from the pedal housing, the first spring may be first compressed so that a first pedal effort may be generated, the second spring may be compressed after the first spring is compressed so that a second pedal effort which is greater than the first pedal effort may be generated, finally the first damper and the second damper may be compressed after the second spring is compressed, and thus an additional pedal effort may be generated so that a third pedal effort which is greater than the second pedal effort may be generated.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a foldable brake pedal apparatus of an autonomous vehicle according to exemplary embodiments of the present invention will be described with reference to the accompanying drawings.

As shown in FIGS. 1 to 9, a foldable brake pedal apparatus of an autonomous vehicle according to various exemplary embodiments of the present invention includes a pedal housing 100 fixed in a space below a driver's seat; a pedal pad 300 pivotably coupled to the pedal housing 100 via a hinge pin 200, in a response to movement of s driver's foot, and configured to be switchable to a hidden state in which the pedal pad is inserted into the pedal housing 100 and a popped-up state in which the pedal pad protrudes from the pedal housing 100; an actuator 400 fixed in the pedal housing 100 and configured to generate power to pivot the pedal pad 300 and allow the pedal pad 300 to become the hidden state and the popped-up state; and a high load spring module 500 pivotably coupled to the pedal housing 100, having one end portion and the other end portion connected to the pedal pad 300 and the actuator 400, and configured to transmit the power of the actuator 400 to the pedal pad 300.

Figure 1:
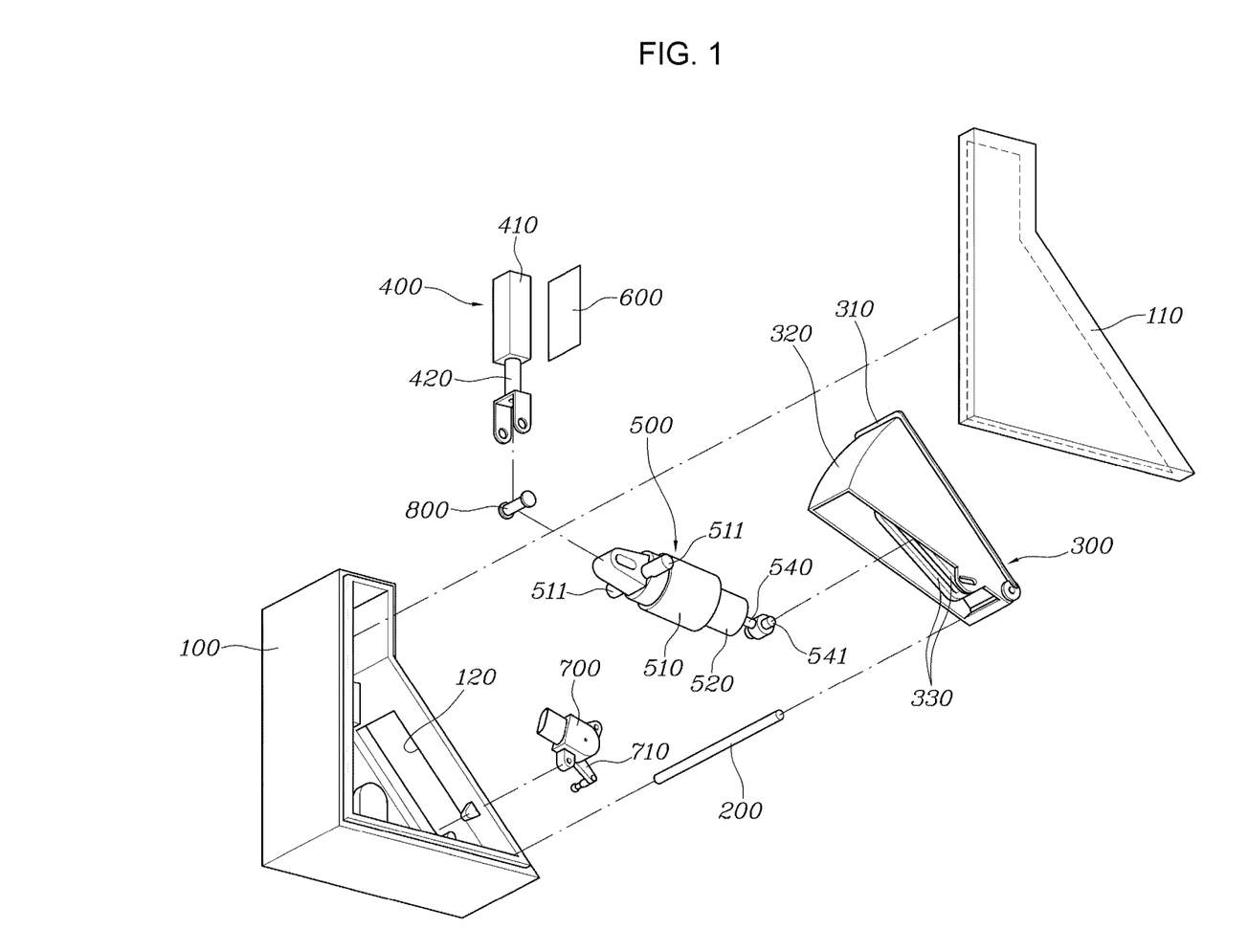
FIG. 1 is an exploded perspective view exemplarily illustrating a foldable brake pedal apparatus of an autonomous vehicle according to various exemplary embodiments of the present invention.
Figure 2:
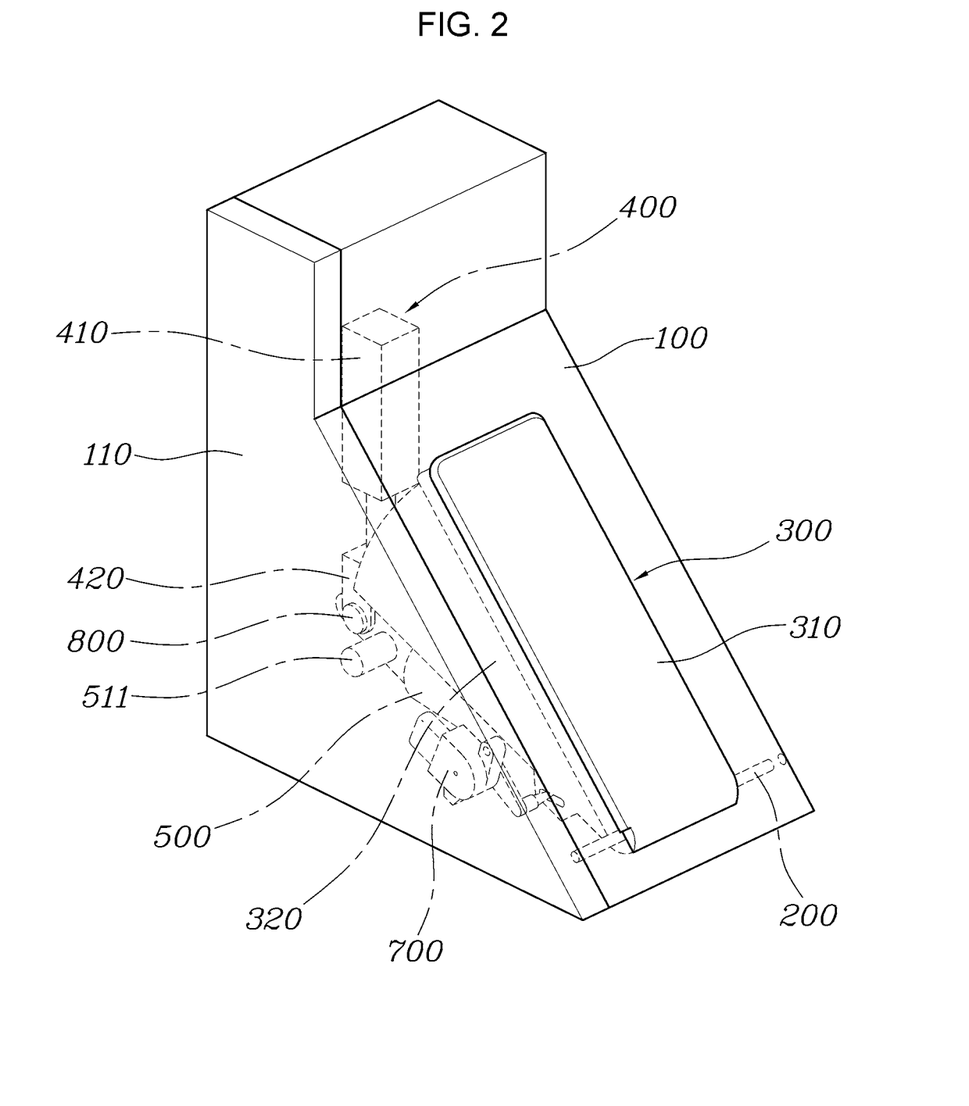
FIG. 2 is a perspective view exemplarily illustrating a coupled state of FIG. 1.
Figure 3:
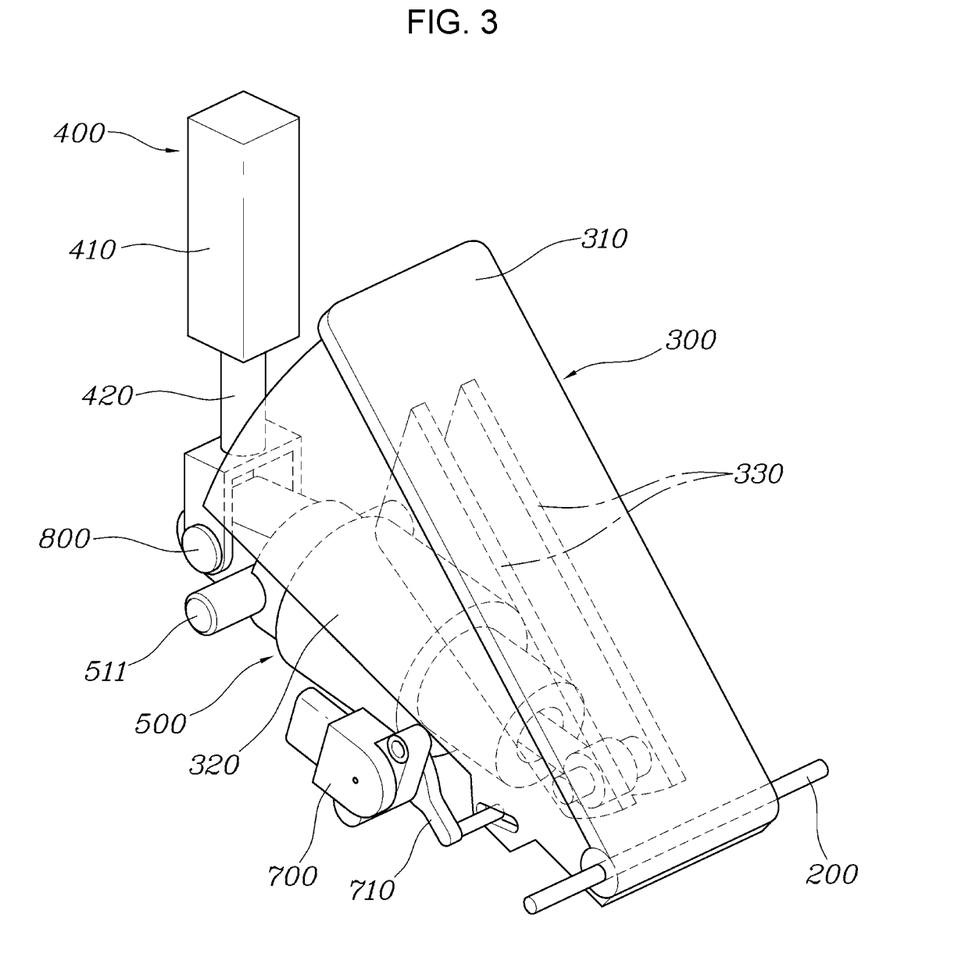
FIG. 3 is a diagram illustrating a state in which a pedal housing is removed in FIG. 2.

The pedal housing 100 is formed in an enclosure shape in which an empty space is present, the actuator 400, the high load spring module 500, an actuator control printed circuit board (PCB), a pedal sensor, and the like, which will be described below, are mounted in the empty space, and a cover 110 is coupled to one side of the pedal housing 100 in a detachable structure.

Furthermore, the exemplary embodiment according to various exemplary embodiments of the present invention further includes an actuator control PCB 600 fixed in the pedal housing 100 and electrically connected to the actuator 400 to control an operation of the actuator 400.

The actuator control PCB 600 is configured to be electrically connected to a power supply, such as a battery, through a wire.

Furthermore, the present invention further includes a pedal sensor 700 fixed in the pedal housing 100, mechanically connected to the pedal pad 300 through a pivoting lever 710, and configured to detect a pivoting angle of the pedal pad 300 when the pedal pad 300 is pivoted to generate a signal related to braking of the vehicle.

When the pedal pad 300 is pivoted back and forth about the hinge pin 200, the pivoting lever 710 is also pivoted.

Furthermore, it is configured such that a permanent magnet is coupled to the pivoting lever 710, a PCB is provided in the pedal sensor 700 to face the permanent magnet, and the PCB is electrically connected to a power supply, such as a battery, through a wire.

Thus, when the pedal pad 300 is pivoted back and forth about the hinge pin 200 as a driver steps on to operate the pedal pad 300, the pivoting lever 710 connected to the pedal pad 300 is also pivoted, and when the pivoting lever 710 is pivoted, a position of the permanent magnet coupled to the pivoting lever 710 is varied, and the pedal sensor 700 detects a pivoting angle of the pedal pad 300 through a variation in strength of a magnetic field according to a variation in pivoting position of the permanent magnet to generate a signal related to braking of the vehicle.

The pedal sensor 700 according to the exemplary embodiment of the present invention is a contact type pedal sensor connected to the pedal pad 300 through the pivoting lever 710 which is a mechanical structure. Alternatively, the pedal sensor 700 may be configured as a non-contact type pedal sensor comprised of only a permanent magnet and only a PCB, as necessary.

The pedal pad 300 is an organ-type pad of which a lower end portion thereof is coupled to the pedal housing 100 via the hinge pin 200, and an upper end portion thereof is pivoted back and forth about the hinge pin 200.

The pedal pad 300 includes an operating surface 310 operated by a foot of the driver and a body 320 formed to protrude forward from the operating surface 310 and having a lower end portion to which the hinge pin 200 coupled. A housing hole 120 through which the body 320 passes is formed in the pedal housing 100.

Thus, when the body 320 of the pedal pad 300 is inserted into the pedal housing 100 according to an operation of the actuator 400, the pedal pad 300 becomes a hidden state in which it is impossible for the driver to operate the pedal pad 300, and when the body 320 of the pedal pad 300 protrudes from the pedal housing 100 due to the operation of the actuator 400, the pedal pad 300 becomes a popped-up state in which it is possible for the driver to operate the pedal pad 300.

Meanwhile, since an external size of the operating surface 310 of the pedal pad 300 is formed to be greater than an external size of the housing hole 120, when the pedal pad 300 is pivoted, the housing hole 120 becomes a structure sealed by the operating surface 310.

When the pedal pad 300 is fully pivoted forward about the hinge pin 200, since the operating surface 310 of the pedal pad 300 does not pass through the housing hole 120, the operating surface 310 is supported on the pedal housing 100 so that a forward pivoting of the pedal pad 300 is naturally restrained.

Furthermore, when the housing hole 120 becomes the structure sealed by the operating surface 310 of the pedal pad 300, it is advantageous for airtightness to prevent an inflow of foreign materials and it is also possible to achieve a noise blocking effect toward an interior of a vehicle.

The actuator 400 according to various exemplary embodiments of the present invention includes a linear-type motor 410 vertically and fixed in the pedal housing 100, and a plunger 420 configured to vertically move back and forth during an operation of the linear-type motor 410 and pivotably coupled to a front end portion of the high load spring module 500.

The linear-type motor 410 may be configured as a linear motor and configured to be electrically connected to a power supply.

Therefore, when the plunger 420 moves back and forth, the high load spring module 500 is pivoted with respect to the pedal housing 100, and due to the pivoting of the high load spring module 500, the pedal pad 300 may be switched to the hidden state of being inserted into the pedal housing 100 or the popped-up state of protruding from the pedal housing 100.

Figure 7:
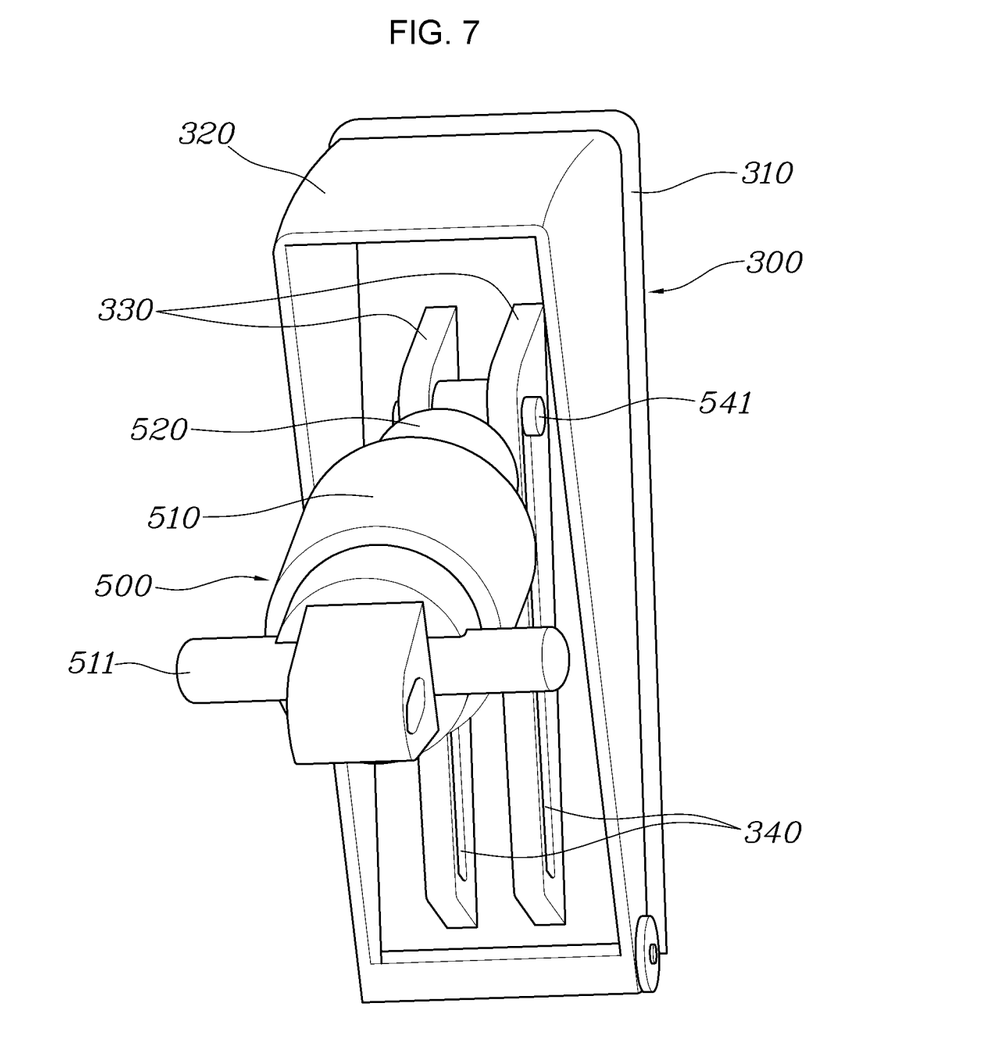
FIG. 7 is a bottom perspective view exemplarily illustrating the pedal pad to which a high load spring module is coupled according to various exemplary embodiments of the present invention.

According to various exemplary embodiments of the present invention, two guide brackets 330 are integrally provided in the body 320 of the pedal pad 300, and guide slots 340 are formed in the two guide brackets 330.

A structure is provided such that the two guide brackets 330 extend in a longitudinal direction of the operating surface 310 and are formed to be spaced from each other in parallel in a left and right direction thereof, the guide slot 340 extending in an inclined direction of the operating surface 310 are formed in the two guide brackets 330, respectively, and a rear end portion of the high load spring module 500 is inserted into the guide slots 340 to be connected to the pedal pad 300.

Therefore, according to the back and forth movement of the plunger 420, the high load spring module 500 is pivoted with respect to the pedal housing 100, and according to a movement of the rear end portion of the high load spring module 500 along the guide slots 340, the pedal pad 300 may be switched to the hidden state of being inserted into the pedal housing 100 or the popped-up state of protruding from the pedal housing 100.

A brake pedal of a vehicle requires a high load for differentiation from an accelerator pedal and for stability during operation. To this end, in the exemplary embodiment according to various exemplary embodiments of the present invention, with a configuration using the high load spring module 500, a pedal effort is implemented using the high load spring module 500. Consequently, it is possible to use a low capacity motor employed in a general foldable accelerator pedal device, and thus there is an advantage which is configured for reducing costs.

Figure 8:
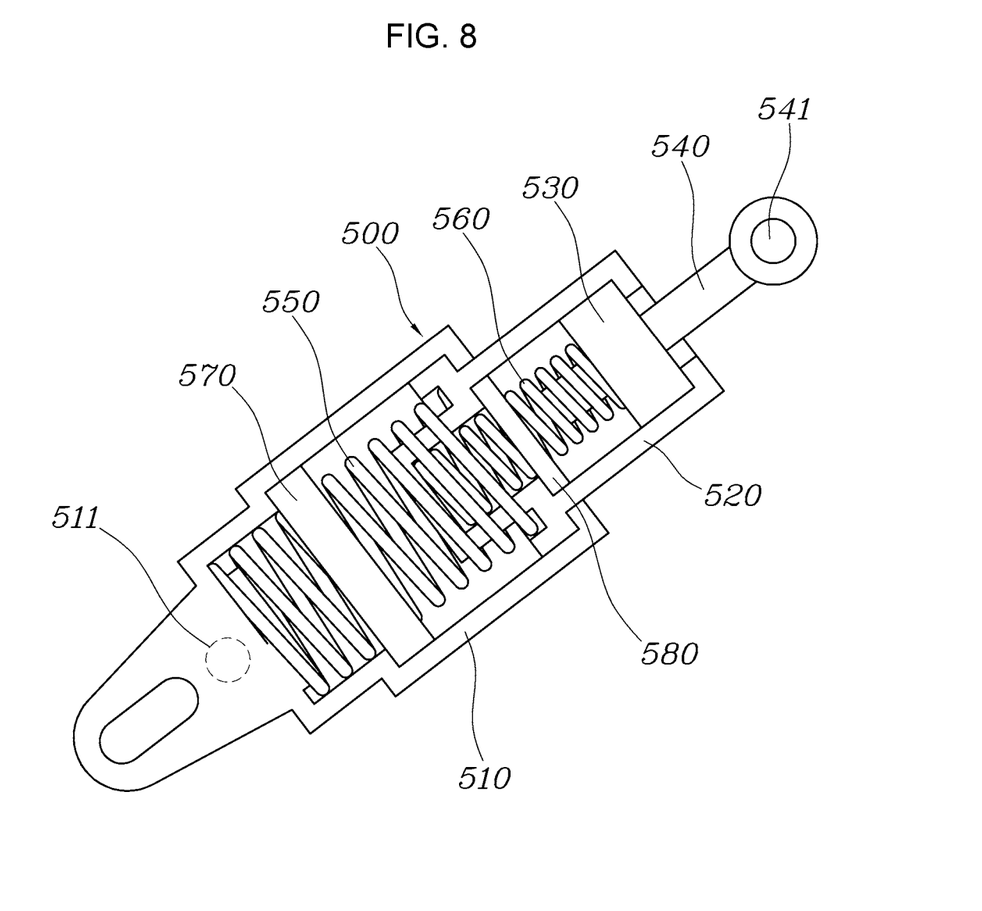
FIG. 8 is a diagram for describing the high load spring module according to various exemplary embodiments of the present invention.

The high load spring module 500 used in various exemplary embodiments of the present invention includes an external cylinder 510 pivotably coupled to the plunger 420 via a connection pin 800 and formed such that a pivoting shaft 511 pivotably coupled to the pedal housing 100 protrudes outward; an internal cylinder 520 having one end portion inserted into the external cylinder 510 and movably coupled to the external cylinder 510 in a longitudinal direction thereof; a spring seat 530 inserted into the internal cylinder 520 and configured to be movable in a longitudinal direction of the internal cylinder 520; a connection rod 540 having one end portion connected to the spring seat 530 and the other end portion connected to a guide pin 541 inserted into the guide slot 340 formed in the pedal pad 300; a first spring 550 located in the external cylinder 510 and having both end portions configured to be supported on the external cylinder 510 and the internal cylinder 520; a second spring 560 located in the internal cylinder 520 and having both end portions configured to be supported on the internal cylinder 520 and the spring seat 530; a first damper 570 fixed in the external cylinder 510 at a position spaced from the internal cylinder 520; and a second damper 580 fixed in the internal cylinder 520 at a position spaced from the spring seat 530.

The present invention is characterized in that a spring force of the second spring 560 is set to be greater than that of the first spring 550.

Thus, a configuration is provided such that, when the pedal pad 300 is pivoted forward about the hinge pin 200 as the driver operates the pedal pad 300 in a popped-up state in which the pedal pad 300 protrudes from the pedal housing 100, the first spring 550 is first compressed so that a first pedal effort is generated, the second spring 560 is compressed after the first spring 550 is compressed so that a second pedal effort which is greater than the first pedal effort is generated, finally the first damper 570 and the second damper 580 are compressed after the second spring 560 is compressed, and thus an additional pedal effort is generated so that a third pedal effort which is greater than the second pedal effort is generated.

Figure 9:
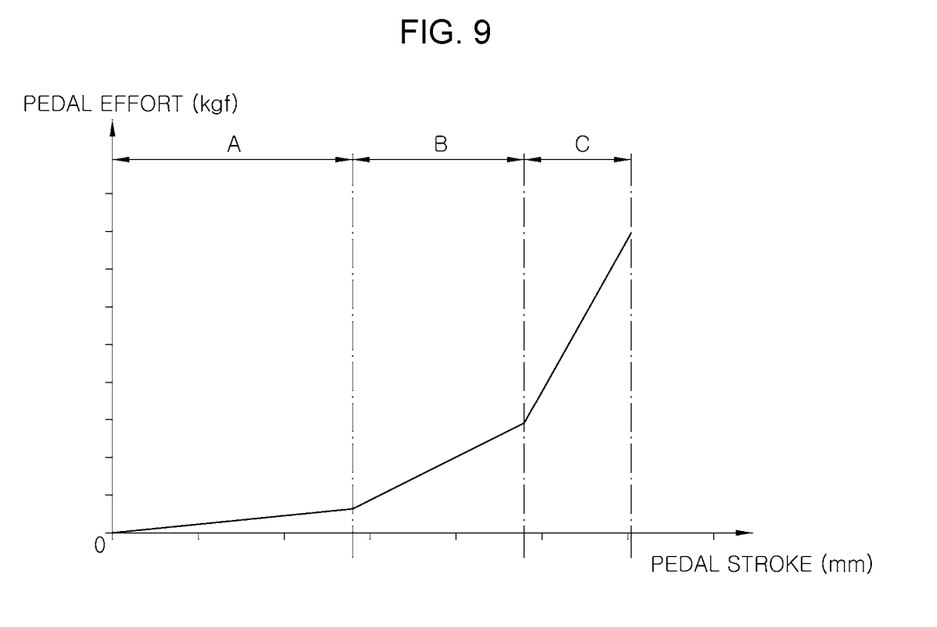
FIG. 9 is a graph showing a pedal effort of the foldable brake pedal apparatus provided with the high load spring module according to various exemplary embodiments of the present invention.

FIG. 9 is a graph showing a pedal effort of the foldable brake pedal apparatus in which the high load spring module 500 is used according to various exemplary embodiments of the present invention. Section A is a first pedal effort generation section due to the compression of the first spring 550, Section B is a second pedal effort generation section due to the compression of the second spring 560 after the compression of the first spring 550, and Section C is finally a third pedal effort generation section due to the compression of the first and second dampers 570 and 580.

Section A is a section in which a negative pressure of the conventional brake booster is formed and a pedal effort is low due to a boosting effect resulting from the negative pressure. Section B is a section in which the negative pressure of the conventional brake booster is extinguished and a pedal effort is high because an effect of the negative pressure is low. Section C is a section in which an additional pedal effort is generated due to compression of rubber dampers and a maximum pedal effort is implemented.

Figure 10:
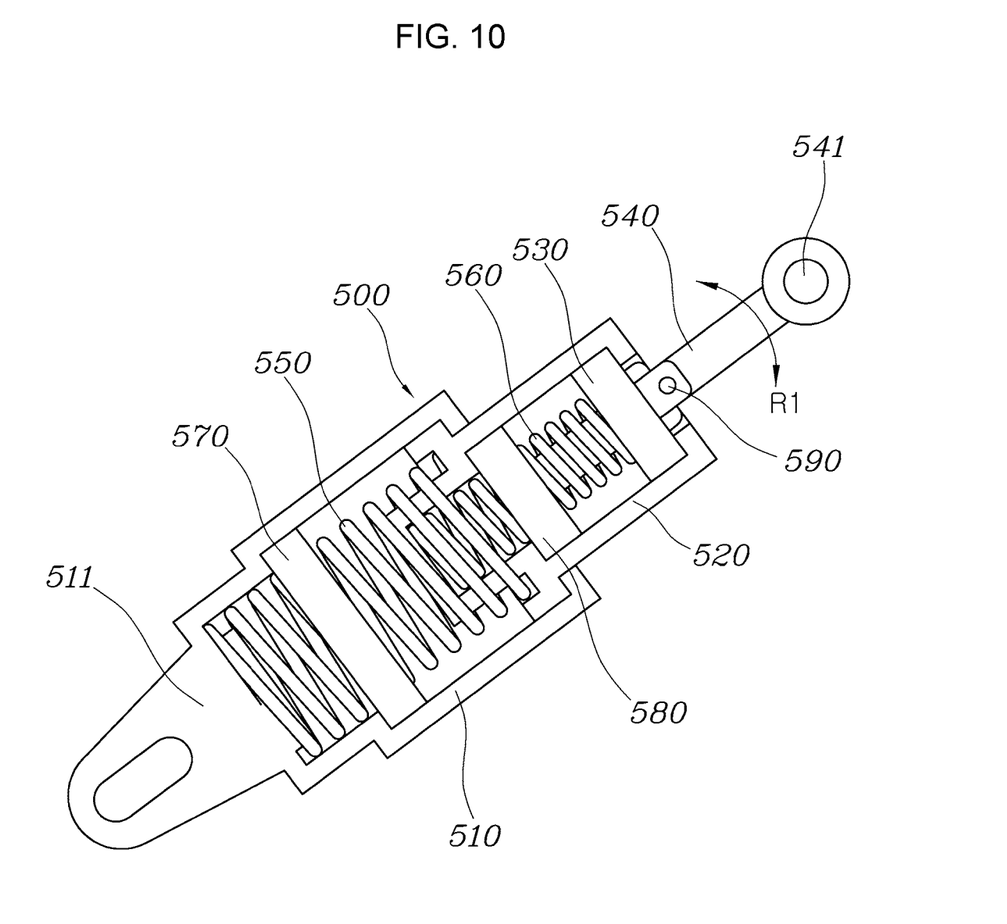
FIG. 10 is a diagram for describing a high load spring module according to various exemplary embodiments of the present invention.

Meanwhile, as shown in FIG. 8, the spring seat 530 and the connection rod 540 which form the high load spring module 500 may be configured in an integrally formed structure. Alternatively, as shown in FIG. 10, the spring seat 530 and the connection rod 540 may be individually formed and configured in a structure in which the spring seat 530 and the connection rod 540 are pivotably coupled via a rod pin 590.

In the case in which a position of the guide pin 541 is M1 based on the popped-up state of the pedal pad 300 and a position of guide pin 541 is M2 when the pedal pad 300 is pivoted forward about the hinge pin 200, when an opening angle between M1 and M2 is not large, a phenomenon in which a pedal effort becomes larger does not occur when the pedal pad 300 is operated by the driver. In the instant case, the structure in which the spring seat 530 and the connection rod 540 are integrally formed is selected so that it is possible to reduce costs.

However, when the opening angle between M1 and M2 is large, the phenomenon in which the pedal effort becomes larger occurs when the pedal pad 300 is operated by the driver so that it is impossible for the driver to smoothly operate the pedal ped 300. To prevent above description, when the spring seat 530 and the connection rod 540 are connected through the rod pin 590 to achieve a pivotable structure, an angle difference may be absorbed so that it is possible for the driver to smoothly operate the pedal pad 300 without the phenomenon in which the pedal effort becomes larger when the pedal pad 300 is operated by the driver.

Figure 4:
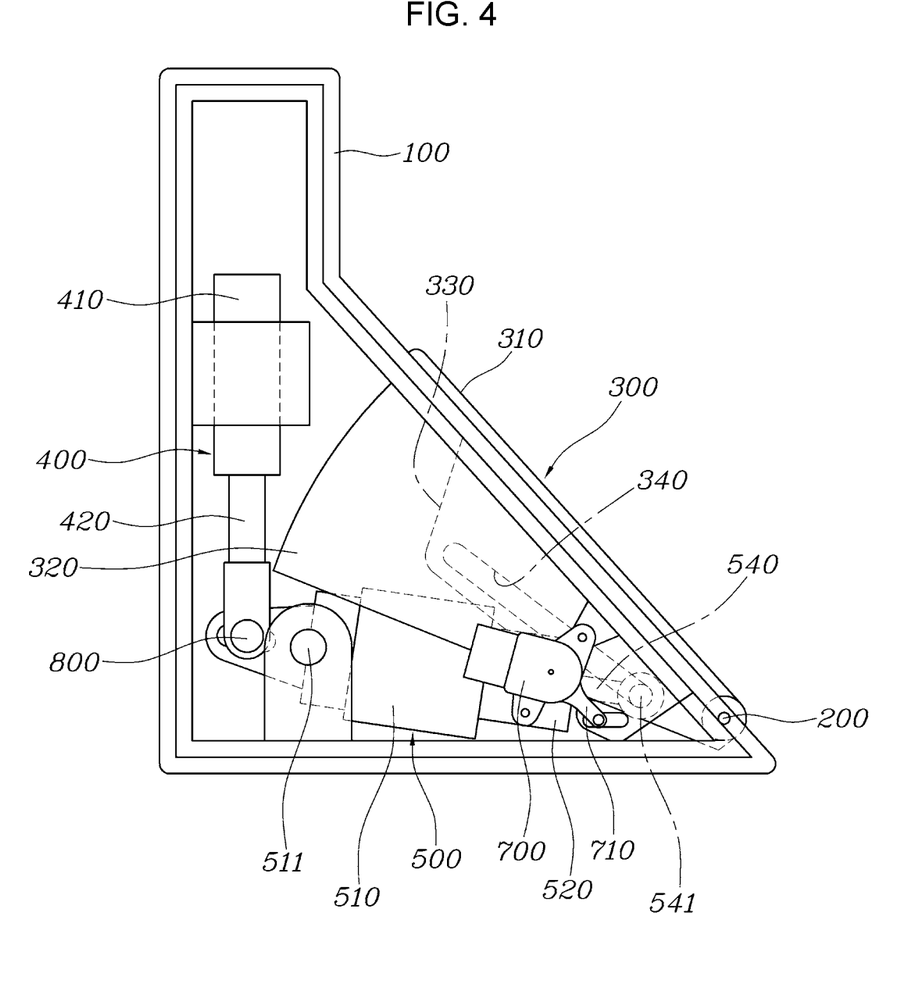
FIG. 4 is a side view of FIG. 2 that illustrates a hidden state in which a pedal pad is inserted into the pedal housing.

FIGS. 2 and 4 illustrate the hidden state in which, as the pedal pad 300 is inserted into the pedal housing 100, exposure of the pedal pad 300 is blocked toward an internal space in which the driver is present.

When a supply of power to the linear-type motor 410 is cut off under the control of the actuator control PCB 600, the plunger 420 performs a rearward movement in which the plunger 420 moves upward to be inserted into the linear-type motor 410, the high load spring module 500 is pivoted with respect to the pedal housing 100 to direct the front end portion, which is connected to the plunger 420, to be located further upward than the rear end portion connected to the guide slot 340 (a state in which the connection pin 800 is located further upward than the guide pin 541), and when the high load spring module 500 is pivoted, the rear end portion of the high load spring module 500 (the guide pin 541) is moved along the guide slot 340 to be located at a lowermost end portion of the guide slot 340. Consequently, the pedal pad 300 becomes the hidden state of being inserted into the pedal housing 100.

As shown in FIG. 4, when the pedal pad 300 becomes the hidden state, the space below the driver's seat becomes a large space without interference with the pedal. Thus, the driver may rest comfortably in a relaxed mode, and furthermore, an incorrect operation of the pedal is prevented in an autonomous driving mode so that improvement in stability may be achieved.

Figure 5:
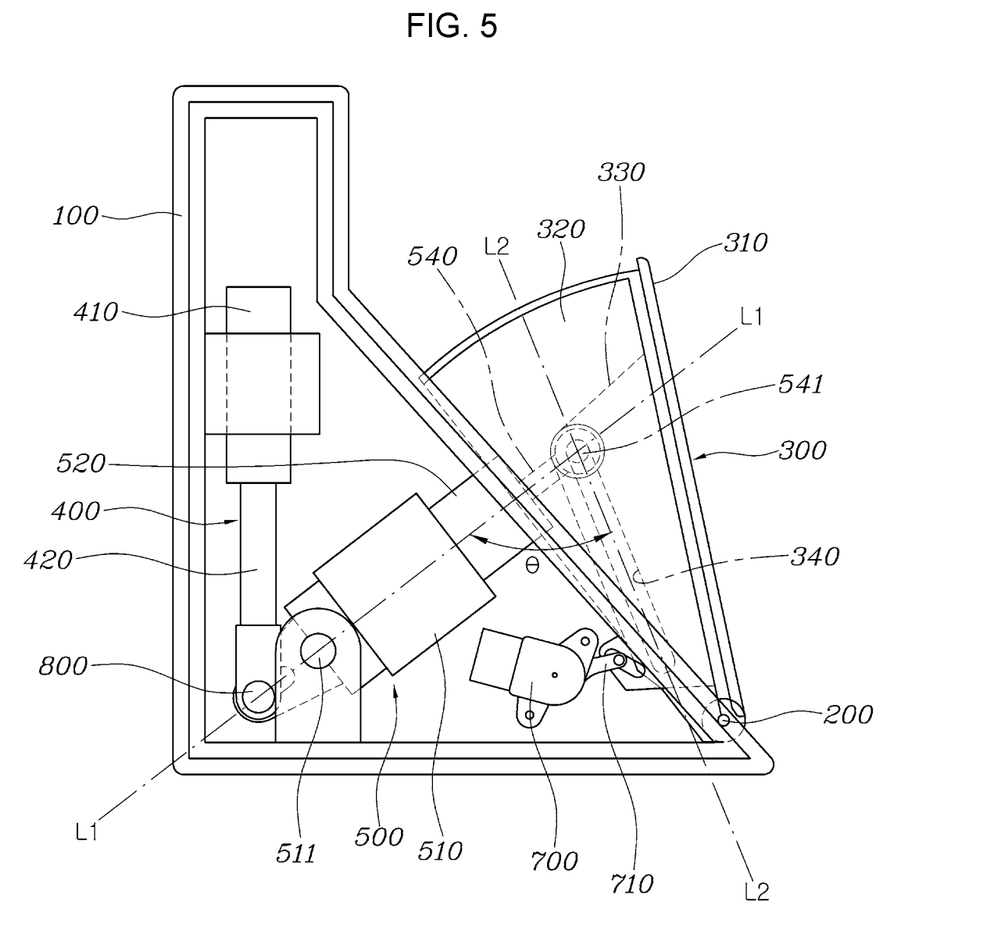
FIG. 5 is a diagram illustrating a popped-up state in which the pedal pad protrudes from the pedal housing in FIG. 4.

FIG. 5 illustrates the popped-up state in which, as the pedal pad 300 protrudes from the pedal housing 100, the pedal pad 300 is exposed toward the internal space in which the driver is present.

When power is supplied to the linear-type motor 410 under the control of the actuator control PCB 600, the plunger 420 performs a forward movement in which the plunger 420 moves downward to protrude outwardly from the linear-type motor 410, the high load spring module 500 is pivoted with respect to the pedal housing 100 to direct the front end portion, which is connected to the plunger 420, to be located further downward than the rear end portion connected to the guide slot 340 (a state in which the connection pin 800 is located further downward than the guide pin 541), and when the high load spring module 500 is pivoted, the rear end portion of the high load spring module 500 (the guide pin 541) is moved along the guide slot 340 to be located at an uppermost end portion of the guide slots 340. Consequently, the pedal pad 300 becomes the popped-up state of protruding from the pedal housing 100 to be exposed to the driver.

As shown in FIG. 5, when the pedal pad 300 becomes the popped-up state of protruding from the pedal housing 100, the driver steps on the operating surface 310 of the protruding pedal pad 300 to operate normally.

Meanwhile, it is characterized in that, based on the popped-up state in which the pedal pad 300 protrudes from the pedal housing 100 (a state of FIG. 5), an angle θ between a first line L1 straightly connecting a center portion in the longitudinal direction of the high load spring module 500 and a second line L2 straightly connecting a center portion in the longitudinal direction of the guide slot 340 is formed to satisfy a condition of 60°≤θ≤90° To allow the pedal pad 300 to operate the high load spring module 500 most efficiently, it is most preferable that the angle θ is 90°.

Since the pedal pad 300 is operated in a direction in which the angle θ is increased when the pedal pad 300 is operated, when an initial value of the angle θ is set in the range of 60°≤θ≤90° based on the popped-up state of the pedal pad 300, a load may be applied to the high load spring module 500 at an angle close to 90° in all sections in which the pedal pad 300 is pivoted so that it is possible to form an operation force most efficiently.

Figure 6:
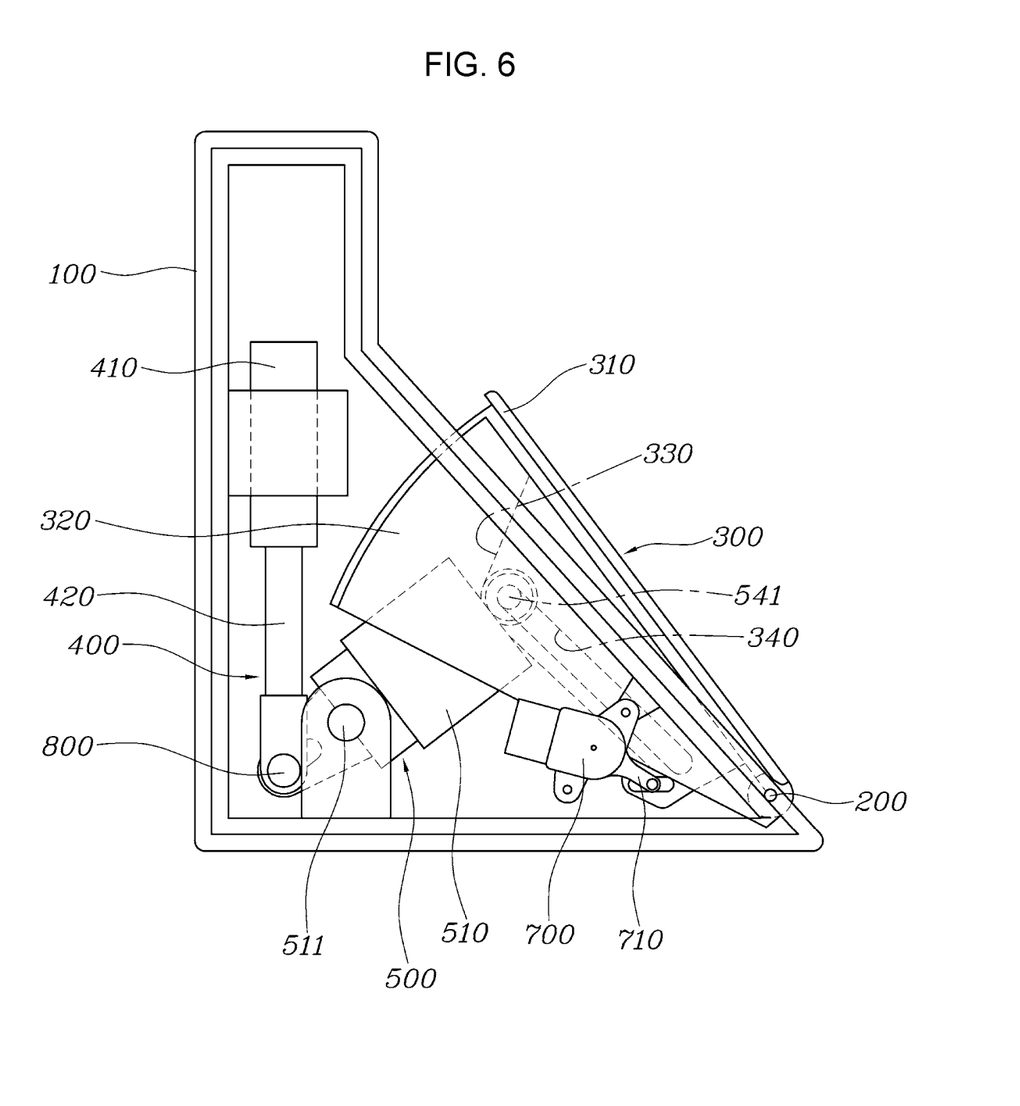
FIG. 6 is a diagram illustrating a state in which the pedal pad is pivoted to operate normally due to an operation of a driver in FIG. 5.

FIG. 6 illustrates a state in which the driver steps on to operate the pedal pad 300 which protrudes from the pedal housing 100 to be popped upwards.

When the driver steps on to operate the operating surface 310 of the popped-up pedal pad 300, the pedal pad 300 is pivoted forward about the hinge pin 200 and the pivoting lever 710 connected to the pedal pad 300 is also pivoted, and when the pivoting lever 710 is pivoted, a position of the permanent magnet coupled to the pivoting lever 710 is varied, and the pedal sensor 700 detects a pivoting angle of the pedal pad 300 through a variation in strength of a magnetic field according to a variation in pivoting position of the permanent magnet to generate a signal related to braking of the vehicle.

According to the exemplary embodiment of the present invention, it is characterized in that, when the high load spring module 500 is pivoted about the pedal housing 100 according to the back and forth movement of the plunger 420 and the pivoting lever 710 connected to the pedal pad 300 is pivoted while the pedal pad 300 is pivoted with respect to the pedal housing 100 due to the pivoting of the high load spring module 500, the pedal sensor 700 does not generate a signal related to braking to prevent an accident caused by an incorrect operation.

That is, when the pedal pad 300 is switched to the hidden state of FIG. 4 or the popped-up state of FIG. 5 due to the operation of the actuator 400, even though the pivoting lever 710 is pivoted due to the pivoting of the pedal pad 300, the pedal sensor 700 does not generate a signal related to braking so that an accident caused by an incorrect operation is prevented.

However, as shown in FIG. 6, in a situation in which the pedal pad 300 is in the popped-up state and the plunger 420 does not perform the back and forth movement, only when the pedal pad 300 is pivoted with respect to the pedal housing 100 due to an operation of the driver and the pivoting lever 710 connected to the pedal pad 300 is pivoted, the pedal sensor 700 generates a signal related to braking so that it is possible to achieve a more stable operation.

As described above, the foldable brake pedal apparatus of an autonomous vehicle according to various exemplary embodiments of the present invention has a configuration in which, in the manual driving mode in which the driver directly drives an autonomous vehicle, the pedal pad 300 protrudes from the pedal housing 100 to be exposed and popped-up toward the driver to allow the driver to operate the pedal pad 300, and in the autonomous driving mode in which the driver does not directly drive the autonomous vehicle, the pedal pad 300 is inserted into the pedal housing 100 to be blocked from being exposed to the driver to prevent an operation of the pedal pad 300 from being performed by the driver so that it is possible to implement a hidden state, and there is an advantage of allowing the driver to rest comfortably in the autonomous driving mode, and furthermore, achieving improvement in stability by blocking an incorrect operation of the pedal pad in the autonomous driving mode.

Furthermore, the foldable brake pedal apparatus of an autonomous vehicle according to various exemplary embodiments of the present invention has a configuration in which a pedal effort is implemented using the high load spring module 500. Consequently, it is possible to use a low capacity motor employed in a general foldable accelerator pedal device so that costs may be reduced.

In accordance with a foldable brake pedal apparatus of an autonomous vehicle according to various exemplary embodiments of the present invention, a configuration may be provided such that, in a manual driving mode in which a driver directly drives an autonomous vehicle, a pedal pad protrudes from a pedal housing to be exposed and popped-up toward the driver to allow the driver to operate the pedal pad, and in an autonomous driving mode in which the driver does not directly drive the autonomous vehicle, the pedal pad is inserted into the pedal housing to be blocked from being exposed to the driver to prevent an operation of the pedal pad from being performed by the driver so that it is possible to implement a hidden state, and there is an effect of allowing the driver to rest comfortably in the autonomous driving mode, and furthermore, achieving improvement in stability by blocking an incorrect operation of the pedal pad in the autonomous driving mode.

Furthermore in accordance, in accordance with a foldable brake pedal apparatus of an autonomous vehicle according to various exemplary embodiments of the present invention, a configuration may be provided such that a pedal effort is implemented using a high load spring module. Consequently, it is possible to use a low capacity motor employed in a general foldable accelerator pedal device so that costs may be reduced.

In addition, the actuator control PCB 600 may be a controller formed of a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable brake pedal apparatus of a vehicle, the apparatus including:
    a pedal housing to be mounted in a space below a driver's seat;
    a pedal pad pivotably coupled to the pedal housing via a hinge pin, to be operated in a response to movement of the driver's foot, and configured to be selectively switchable to a hidden state in which the pedal pad is inserted into the pedal housing or a popped-up state in which the pedal pad protrudes from the pedal housing;
    an actuator fixed in the pedal housing, coupled to the pedal pad and configured to generate power to pivot the pedal pad to allow the pedal pad to be in the hidden state or in the popped-up state; and
    a spring module pivotably coupled to the pedal housing, having a first end portion connected to the pedal pad and a second end portion directly connected to the actuator and configured to transmit the power of the actuator to the pedal pad.

2. The foldable brake pedal apparatus of claim 1, further including:
    an actuator control printed circuit board (PCB) fixed in the pedal housing and electrically connected to the actuator to control an operation of the actuator.

3. The foldable brake pedal apparatus of claim 1, further including:
    a pedal sensor fixed in the pedal housing, mechanically connected to the pedal pad through a pivoting lever, and configured to detect a pivoting angle of the pedal pad when the pedal pad is pivoted about the pivot pin to generate a signal related to braking of the vehicle.

4. The foldable brake pedal apparatus of claim 3, wherein the actuator includes:
a linear motor fixed in the pedal housing; and
a plunger coupled to the linear motor and configured to vertically move back and forth during an operation of the linear motor and pivotably coupled to a front end portion of the spring module, and
wherein, when the plunger moves back and forth, the spring module is pivoted with respect to the pedal housing, and according to pivoting of the spring module, the pedal pad is switched to the hidden state or the popped-up state.

5. The foldable brake pedal apparatus of claim 4, wherein the pedal pad includes an operating surface to be operated according to movement of the driver's foot and a guide slot extending in an inclined direction of the operating surface;
wherein a rear end portion of the spring module is inserted into the guide slot to be connected to the pedal pad; and
wherein according to a back and forth movement of the plunger, the spring module is pivoted with respect to the pedal housing, and according to a movement of the rear end portion of the spring module along the guide slot, the pedal pad is switched to the hidden state or the popped-up state.

6. The foldable brake pedal apparatus of claim 5, wherein, when a supply of power to the linear motor is cut off, the plunger is configured to perform a rearward movement in which the plunger is inserted into the linear motor, the spring module is pivoted with respect to the pedal housing to direct the front end portion of the spring module, which is connected to the plunger, to be located further upward than the rear end portion of the spring module connected to the guide slot, and when the spring module is pivoted, the rear end portion of the spring module is moved along the guide slot to be located at a lowermost end portion of the guide slot so that the pedal pad becomes to be in the hidden state.

7. The foldable brake pedal apparatus of claim 5, wherein, when power is supplied to the linear motor, the plunger is configured to perform a forward movement in which the plunger protrudes outwardly from the linear motor, the spring module is pivoted with respect to the pedal housing to direct the front end portion of the spring module, which is connected to the plunger, to be located further downward than the rear end portion of the spring module connected to the guide slot, and when the spring module is pivoted, the rear end portion of the spring module is moved along the guide slot to be located at an uppermost end portion of the guide slots so that the pedal pad becomes to be in the popped-up state.

8. The foldable brake pedal apparatus of claim 7, wherein, according to the popped-up state in which the pedal pad protrudes from the pedal housing, an angle θ between a first line straightly connecting a center portion in a longitudinal direction of the spring module and a second line straightly connecting a center portion in a longitudinal direction of the guide slot is formed to satisfy a condition of 60°≤θ≤90°.

9. The foldable brake pedal apparatus of claim 5, wherein the spring module includes:
an external cylinder pivotably coupled to the plunger via a connection pin and formed so that a pivoting shaft pivotably coupled to the pedal housing protrudes outward;
an internal cylinder having an end portion inserted into the external cylinder and movably coupled to the external cylinder in a longitudinal direction of the external cylinder;
a spring seat inserted into the internal cylinder and configured to be movable in a longitudinal direction of the internal cylinder;
a connection rod having a first end portion connected to the spring seat and a second end portion connected to a guide pin inserted into the guide slot formed in the pedal pad;
a first spring located in the external cylinder and having a first end portion and a second end portion supported on the external cylinder and the internal cylinder, respectively;
a second spring located in the internal cylinder and having a first end portion and a second end portion supported on the internal cylinder and the spring seat, respectively;
a first damper fixed in the external cylinder at a position spaced from the internal cylinder; and
a second damper fixed in the internal cylinder at a position spaced from the spring seat.

10. The foldable brake pedal apparatus of claim 9, wherein a spring force of the second spring is set to be greater than a spring force of the first spring.

11. The foldable brake pedal apparatus of claim 9, wherein the spring seat and the connection rod are integrally formed.

12. The foldable brake pedal apparatus of claim 9, wherein the spring seat and the connection rod are respectively formed and are pivotably coupled via a rod pin.

13. The foldable brake pedal apparatus of claim 9, wherein, when the pedal pad is pivoted forward about the hinge pin as the driver operates the pedal pad in a popped-up state in which the pedal pad protrudes from the pedal housing, the first spring is first compressed so that a first pedal effort is generated, the second spring is compressed after the first spring is compressed so that a second pedal effort which is greater than the first pedal effort is generated, finally the first damper and the second damper are compressed after the second spring is compressed, and thus an additional pedal effort is generated so that a third pedal effort which is greater than the second pedal effort is generated.

14. The foldable brake pedal apparatus of claim 4, wherein, when the spring module is pivoted with respect to the pedal housing according to a back and forth movement of the plunger, and the pivoting lever connected to the pedal pad is pivoted while the pedal pad is pivoted with respect to the pedal housing according to the pivoting of the spring module, the pedal sensor does not generate a signal related to the braking to prevent an incorrect operation.

15. The foldable brake pedal apparatus of claim 4, wherein, in a situation in which the pedal pad is in the popped-up state and the plunger does not perform the back and forth movement, only when the pedal pad is pivoted with respect to the pedal housing due to an operation of the driver and a pivoting lever connected to the pedal pad is pivoted, a pedal sensor generates a signal related to the braking of the vehicle.

16. The foldable brake pedal apparatus of claim 1, wherein the pedal pad includes a lower end portion coupled to the pedal housing via the hinge pin, and an upper end portion pivoted back and forth about the hinge pin.

17. The foldable brake pedal apparatus of claim 1,
wherein the pedal pad includes an operating surface to be operated according to movement of the driver's foot and a body formed to protrude forward from the operating surface and having a lower end portion to which the hinge pin is pivotally coupled; and
wherein the pedal pad becomes to be in the hidden state when the body is inserted into the pedal housing according to an operation of the actuator and becomes to be in the popped-up state when the body protrudes from the pedal housing.

18. The foldable brake pedal apparatus of claim 1,
wherein the pedal pad includes an operating surface to be operated according to movement of the driver's foot and a body formed to protrude forward from the operating surface and having a lower end portion to which the hinge pin is pivotally coupled;
wherein a housing hole through which the body passes is formed in the pedal housing; and
wherein an external size of the operating surface of the pedal pad is formed to be greater than an external size of the housing hole so that, when the pedal pad is pivoted, the housing hole is sealed by the operating surface.

* * * * *